United States Patent Office 3,479,235
Patented Nov. 18, 1969

3,479,235
BERYLLIUM-CONTAINING POLYMERIC
PROPELLANT COMPOSITIONS
Gaetano F. D'Alelio, South Bend, Ind., assignor to Dal Mon Research Co., Cleveland, Ohio, a corporation of Delaware
No Drawing. Continuation of applications Ser. No. 751,107, July 28, 1958; Ser. No. 761,484, Sept. 17, 1958; and Ser. No. 762,227, Sept. 22, 1958. This application Sept. 27, 1961, Ser. No. 141,015
Int. Cl. C06c 5/02
U.S. Cl. 149—19                    20 Claims This invention relates to polymers containing beryllium. This application is a continuation of applicant's copending applications Ser. Nos. 751,107, filed July 28, 1958; 761,484, filed Sept. 17, 1958, and 762,227, filed Sept. 22, 1958 all now abandoned.

Because of the high energy content of such compounds, beryllium compounds having beryllium to carbon bonds, such as beryllium alkyls, should be useful as fuel compositions. However, because of their tendency to ignite spontaneously upon exposure to air, and the highly reactive nature of these compounds, the use of beryllium alkyls involves considerable danger and necessitates various precautionary steps. Moreover, since they are liquids, their use as propellant fuels for rockets, missiles, and related devices, has the drawback common to liquid fuels in that complicated containers and pumping devices are required, and the sloshing effect of the liquids in their containers causes shifting of weight which adversely affects directional control.

In accordance with the present invention, polymeric beryllium compounds have been discovered which have more easily controlled flammability and reactivity while still retaining high energy content. Such polymeric materials can be made in a solid state and thereby have the inherent advantages of solid fuels used for propelling purposes.

It has surprisingly been found that compositions particularly effective as solid propellant fuels are prepared from 5–95% of solid or liquid oxidizing agent of the type used in solid propellant fuel compositions, such as potassium prochlorate, etc. and 5–95% of a polymer prepared from polyunsaturated ethers having a plurality of unsaturated groups therein, e.g. ethylenic and acetylenic groups, or monoacetylenic ethers, such as divinyl ether, etc., as described more fully hereinafter and beryllium hydrides, and/or their hydrocarbon derivatives, hereinafter referred to generally as beryllium hydride compounds, which can be made to react in such a manner as to produce polymers having beryllium in the polymer chain and in relatively high proportions. The polymers produced accordingly have a plurality of repeating units of the formula —Be—Y— in the polymer molecules wherein Y is a polyvalent radical having at least one ether group therein, the remainder of said radical being hydrocarbon, and having each of said valencies connected to a carbon atom in said hydrocarbon portion, and R represents hydrogen or hydrocarbon radical, the hydrocarbon radical preferably containing no more than about 24 carbon atoms. Preferably there are more than two such repeating units in each polymer molecule, advantageously more than 4.

The polyunsaturated ethers that can be used in the practice of this invention include those having at least one ether linkage between unsaturated groups. The hydrocarbon derivatives of the beryllium hydrides include those in which one or more, including all of the hydrogen of a beryllium hydride, is replaced by one or more hydrocarbon radicals, such as aliphatic, aromatic, cycloaliphatic radicals, including combinations thereof, such as aralkyl, alkaryl, cycloalkyl-aryl, aryl-cycloalkyls compounds, etc. The beryllium hydride compounds are reacted with the unsaturated ethers described herein (including those having substitutents thereon which are non-reactive to said beryllium hydride compounds), having a plurality of ethylenic or acetylenic groups therein, or only one of said acetylenic groups therein.

Such compositions can be made in liquid or solid form, and can be converted to infusible forms. Particularly useful infusible solid fuels can be made by incorporating a solid or liquid oxidizing agent into the polymeric compositions of this invention while they are in a liquid or thermoplastic state, and then converting the polymer to a crosslinked, infusible condition.

Typical examples of the hydrides and hydrocarbon substituted hydrides of beryllium which can be used in the practice of this invention include, but are not limited to, the following: beryllium hydride, beryllium alkyl hydrides, such as methyl beryllium hydride, ethyl beryllium hydride, propyl beryllium hydride, butyl beryllium hydride, octyl beryllium hydride, nonyl beryllium hydride, styryl beryllium hydride, cyclohexyl beryllium hydride, phenyl beryllium hydride, dimethyl beryllium, diethyl beryllium, methyl ethyl beryllium, dipropyl beryllium, dibutyl beryllium, ethyl butyl beryllium, diamyl beryllium, dioctyl beryllium, distyryl beryllium, methyl phenyl beryllium, dicyclohexyl beryllium, ethyl cyclohexyl beryllium, dicyclopentyl beryllium ,etc. These beryllium compounds, sometimes generally referred to hereinafter as beryllium hydride compounds, can be used as such or in various complex forms, such as complexes with ethers, tertiary amines, thioethers, etc.

Polymers useful in this invention can be derived from polyalkenyl ethers have a plurality of repeating units therein which can be represented by the formula —Be—Y— in which Y is a polyvalent radical having an ether linkage between each two said valencies. Such polyvalent groups can be derived from a polyalkenyl ether compound having a plurality of ethylenic groups therein, and having the formula

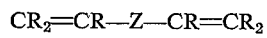
$$CR_2\!=\!CR\!-\!Z\!-\!CR\!=\!CR_2$$

wherein R represents hydrogen or a hydrocarbon group, and Z represents oxygen or a polyvalent group comprising hydrocarbon portions having at least one ether linkage between each two valencies. The hydrocarbon portions of R and Z can have attached thereto substituents which are non-reactive toward the beryllium hydride compound used in the preparation of the polymer. However, additional ethylenic groups can also be attached to R and Z through ether linkages.

While it is believed that each beryllium atom becomes attached to one of the carbon atoms of an ethylenic group, it is also possible that the beryllium migrates during or after the reaction between the beryllium hydride compound and the polyalkenyl compound, and becomes attached to another carbon atom of the polyalkenyl compound that gives a more stable derivative. Thus, the beryllium may actually be attached to one of the R groups, or to Z. For that reason, Y is represented as a polyvalent radical having the formula

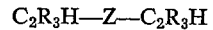
$$C_2R_3H\!-\!Z\!-\!C_2R_3H$$

in which the specific carbon atoms to which the beryllium is attached are not specified.

Accordingly, the polymeric products can be represented by the formula:
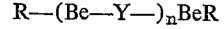
$$R\!-\!(Be\!-\!Y\!-\!)_n BeR$$

or Y can be replaced by the above formula for Y in which the actual points of attachment of the beryllium are not pinpointed, as follows:

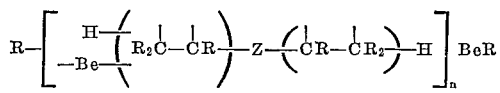

or generally can be simplified, particularly when the ethylenic groups are vinyl or vinylidene groups, to

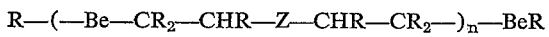

Infusible polymers can be obtained in the practice of this invention by using, together with the polyalkenyl ether, a hydrocarbon compound having three or more ethylenic groups therein, by using a polyalkenyl ether having a third alkenyl group therein, or by using, together with the beryllium hydride compound, a trivalent metal compound, such as the boron and aluminum hydrides and their hydrocarbon-substituted hydrides.

When compounds having three or more ethylenic groups are used, the crosslinking is effected through another Y group, which can also be represented by the various formulas indicated above for Y. When a trivalent metal compound is used, together with the beryllium hydride compound, the crosslinkage can also be represented as a Y group which will be connected between polymer molecules through the trivalent metal atoms.

In the polymerization described herein, when conditions permit, the hydrocarbon group which is replaced by the polyalkenyl compound, generally escapes from the system as an olefin. In cases of closed systems, the buildup of pressure, or the reluctance of a radical such as phenyl toward olefin formation, can result in the attachment of the hydrocarbon group to the carbon atom of the ethylenic group, other than the one to which the beryllium is attached.

Various modifications of polymeric materials can be made, according to the practice of this invention, by adjusting the proportions of reactants and the conditions under which the materials are made to react. For example, the amount of crosslinking is controlled by the amount of compound having three or more ethylenic groups therein that is added, or the amount of trivalent metal compound that is added for that purpose. The selectivity, type of reaction, and product, can be controlled somewhat by selecting appropriate beryllium compounds, concentration thereof, polyalkenyl compound, and also by the use of certain amounts of monoalkenyl compounds.

For example, since the hydrogen in these beryllium compounds is generally more easily replaced than alkyl compounds, it is possible thereby to control somewhat the type and extent of reaction.

When it is desired to control the molecular weight of a linear polymer, or to put terminal carbon groups on a polymer chain, this can be accomplished by using a monoolefin, such as ethylene, together with the polyalkenyl compound. The latter can also be effected by using a mono- or di-substituted beryllium, alone or together with unsubstituted beryllium hydride.

Some control over the type and extent of reaction can be effected by using beryllium hydride compounds having hydrocarbon groups of different sizes. It is sometimes desirable, also, that the hydrocarbon groups to be replaced by the polyalkenyl compound be of a smaller size than the polyalkenyl compound. This is particularly desirable where there is a displaced hydrocarbon group escaping as a byproduct olefin. In some cases, a polyalkenyl compound of higher boiling point than the resultant olefin permits escape of the olefin upon refluxing of the polyalkenyl compound, or upon maintaining the reaction temperature below that at which the polyalkenyl compound vaporizes to an undesirable extent. In some cases, particularly where the difference in volatility is not great, the olefin can be permitted to escape in a stream of inert gas with additional polyalkenyl compound being fed to the system. In cases where the polyalkenyl compound has a higher vapor pressure than any olefin that might be given off as byproduct, a closed system can advantageously be used to favor the desired displacement.

The temperature conditions for the promotion of polymer formation, in accordance with the practice of this invention, vary in accordance with the reactivity of the reagents being used. When a beryllium hydride is being reacted with a polyalkenyl compound, a temperature in the range of 70°–80° C. is generally suitable. When beryllium hydride compounds containing both hydrogen and hydrocarbon groups are used, the reaction can be controlled mainly to displace the hydrogen by keeping the temperature below 100° C. When hydrocarbon groups are to be displaced from a beryllium hydride compound, a temperature of about 100–120° C. is preferred. Depending upon the decomposition temperature of the particular reagent, and the polymeric product, it is generally advantageous not to exceed a temperature of about 140° C. When a mixture of a beryllium hydride and a beryllium hydride compound containing hydrocarbon groups is being used, it is generally desirable to maintain the appropriate temperature until most of the hydrogen has been displaced and then to raise the temperature to that more suitable for displacement of the hydrocarbon group. In some cases the temperature control can be facilitated by the use of an inert solvent, such as heptane, octane, benzene, toluene, xylene, etc., whose boiling point is close to the desired temperature.

The time required for polymer formation varies in accordance with the reactivity of the ethylenic groups in the polyalkenyl compound, the type of group to be displaced in the beryllium hydride compound, the temperature being used, and various other factors which favor the reaction, such as the use of metal catalysts, such as nickel, cobalt, etc., the removal of the byproduct olefine, etc. With respect to the last condition, an increase in concentration of such byproduct olefin promotes an equilibrium which competes with the progress of the polymer formation. Therefore, unless the olefin is permitted to escape, or it is absorbed by addition, this tends to slow down the polymerization. The polymerization proceeds most rapidly with vinyl groups in the polyalkenyl compound. Vinylidene groups also react rapidly when the second group attached to the doubly substituted carbon is relatively small. With larger groups in that position, longer reaction times and increased temperatures, but still below decomposition temperature, are desirable. Ethylenic groups having hydrocarbon groups attached to both the alpha and the beta carbon atoms are still less reactive than the vinylidene groups, and require longer reaction time even at the more favorable temperature conditions. The time will also vary in accordance with the degree of polymerization required. While the more active reagents can give polymers in even less time, many of the polymeric products of this invention can be produced at moderate temperatures in a matter of 12 to 48 hours. In some cases, such as with the nonreactive type of ethylenic groups, or when low temperatures, for example as low as 50° C., are used, much longer reaction periods are desirable. In such cases, the reaction is continued until a solid product is obtained.

Polyalkenyl compounds that can be used in the practice of this invention include those having the formula

wherein R and Z are as defined above. Typical polyalkenyl compounds that can be used in the practice of this invention include, but are not limited to, the following: divinyl ether, diallyl ether, vinyl allyl ether, propenyl vinyl ether, propenyl allyl ether, divinyl ether or resorcinol, divinyl ether of ethylene glycol, diallyl ether or ethylene glycol, divinyl ether of di-ethylene glycol, diisopropenyl ether, isopropenyl vinyl ether, isopropenyl allyl ether, isopropenyl butenyl ether, isopropenyl isoamylene ether, divinyloxy benzene, divinyloxy toluene, diallyl ether of resorcinol, diisobutenyl ether of hydroquinone, para-vinyloxy styrene, para-allyloxy styrene, triallyloxy benzene, tripropenyloxy benzene, etc.

While the foregoing discussion uses polyalkenyl ethers for illustration, the same rules also apply to the reaction of ether compounds having one acetylenic group therein, those having one acetylenic group with one or more ethylenic groups, and also those having a plurality of acetylenic groups. In such cases, the same conditions apply as described above except that two beryllium atoms can be added to the carbon atoms of the acetylenic group instead of one beryllium being added as with an ethylenic group. Typical acetylenic ethers that can be used in the practice of this invention include, but are not limited to, the following: vinyl-phenyl propargyl ether, vinyloxy-phenyl acetylene, propargyl vinyl ether, dipropargyl ether, allyloxy-phenyl-actylene, propargyl ethyl ether, propargyl phenyl ether, etc.

Also useful in the practice of this invention are polymers having ether groups therein and a plurality of unsaturated groups, e.g., ethylenic and acetylenic groups. Typical polymeric starting materials are polymers of the above listed polyunsaturated ether compounds in which a substantial number of the unsaturated groups therein remain unpolymerized. Preferred polymers of this type are linear polymers in which one of the unsaturated groups in the polyunsaturated ether monomer is polymerized to form a linear carbon chain which has a number of unsaturated groups attached to the linear carbon chain through the ether group of the original monomer compound.

Polymers having pendant vinyl, vinylidene or acetylenic groups are preferred in the practice of this invention. Typical polymers are those having repeating units of the following types:

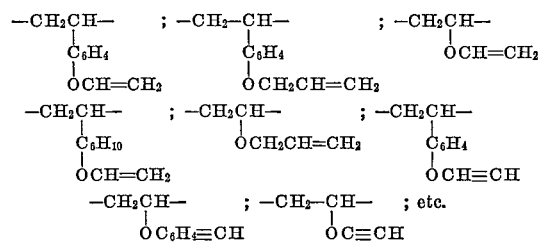

Typical monoalkenyl modifiers that can be used in the practice of this invention include, but are not limited to, the following: vinyl methyl ether, vinyl ethyl ether, vinyl butyl ether, vinyl propyl ether, vinyl amyl ether, vinyl cyclohexyl, vinyl phenyl, vinyl tolyl, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, ethylene, propylene, butene-1, butene-2, hexene-1, hexene-2, t-butyl-ethylene, 2,4,4-trimethyl-1-pentene, 2,4,4-trimethyl pentene-2, cyclopentene, cyclohexene, styrene, 1,1-diphenyl ethylene, vinyl cyclohexane, alpha-methyl-styrene, vinyl naphthalene, beta-methyl styrene, allyl benzene, allyl cyclohexane, decene-1, decene-2, decene-3, decene-5, dodecene-1, dodecene-2, tetradecene-1, hexadecene-2, cyclopentene, etc.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric." Molecular weights given herein are Staudinger molecular weights.

EXAMPLE I

A mixture of 67 parts of diethyl beryllium dissolved in 100 parts of hexane is added to 162 parts of divinyloxy benzene and is heated in an atmosphere of nitrogen to boil off the hexane. The temperature is raised and maintained at 100° C. Ethylene is gradually evolved from the reaction mixture. After heating for 72 hours, the reaction mixture is cooled and a solid product is obtained. This is ground with an equal weight of ammonium perchlorate. The resultant mixture burns vigorously when ignited and when tested for propellant thrust shows excellent thrust properties.

EXAMPLE II

The procedure of Example I is repeated, except that in place of the divinyloxy benzene, a mixture of 130 parts of divinyloxy benzene and 40 parts of trivinyloxy benzene is used. In this case, an infusible product is obtained, which, after grinding with an equal weight of ammonium perchlorate, shows vigorous burning properties when ignited, and excellent thrust properties.

In three additional tests, similar results are obtained, using in each case four parts of this polymer ground individually with six parts of ammonium nitrate, lithium perchlorate, and potassium perchlorate, respectively.

EXAMPLE III

The procedure of Example I is repeated, using in place of the diethyl beryllium a mixture of 44 parts of diethyl beryllium, and 38 parts of triethyl aluminum. An infusible product is obtained which, when ground with an equal weight of ammonium perchlorate, burns vigorously upon ignition, and shows excellent thrust properties.

EXAMPLE IV

The procedure of Example I is repeated using in place of the divinyloxy benzene, an equivalent weight of divinyl ether, omitting the hexane, and sealing the mixture under vacuum in a glass tube. The resultant solid product shows similar burning and thrust properties as for the product of Example I.

EXAMPLE V

The procedure of Example IV is repeated with similar results, using 39 parts of ethyl beryllium hydride and 98 parts of diallyl ether.

EXAMPLE VI

The following procedure is followed a number of times, using in each case a different mixture as indicated in Table I below. The number appearing before a particular compound in this table and in subsequent tables indicates the number of parts by weight of that compound used. In each case the mixture is maintained under an atmosphere of nitrogen and the temperature is raised gradually over a period of several hours and then maintained at 120°–130° C. for a period of about 72 hours. In each case, the resultant solid product is processed as in Example I and upon testing exhibits excellent burning and thrust porperties.

TABLE I

| | |
|---|---|
| 60 Dipropyl beryllium | 260 Divinyloxy toluene. |
| 46 Tripropyl boron | 1 Ethyl ether. |
| 80 Diphenyl beryllium | { 320 Divinyloxy diphenyl. |
| 120 Triphenyl aluminum | |
| 220 Distyryl beryllium | { 140 Diallyl ether of ethylene glycol. <br> { 20 Triallyl ether of glycerine. |
| 265 Dicyclohexyl beryllium | { 250 Diisopropenyloxy benzene. <br> { 60 Triisopropenyloxy benzene. |
| 155 Dibutyl beryllium | { 250 Diallyloxy benzene. <br> { 60 Triallyloxy benzene. |
| 250 Di-(3-phenyl-propyl) beryllium | { 160 Divinyloxy naphthalene. <br> { 50 Triallyloxy benzene. |

EXAMPLE VII

The following procedure is repeated a number of times, using in each case a different mixture as indicated in Table II below. In each case the mixture is heated under a nitrogen atmosphere, and in accordance with the corresponding increase in reflux temperature, the temperature is gradually increased to 75°–90° C., and maintained in that range for approximately 72 hours. The products are processed as in Example I, and each product exhibits excellent burning and thrust properties.

TABLE II

| | |
|---|---|
| 115 Styryl beryllium hydride | { 80 Divinyloxy benzene. <br> { 70 Trivinyloxy benzene. |
| 39 Ethyl beryllium hydride | 130 Trivinyloxy naphthalene. |
| 53 Propyl beryllium hydride | { 130 Divinyloxy cyclohexane. <br> { 15 Trivinyloxy benzene. |
| 87 Phenyl beryllium hydride | { 190 Divinyloxy cyclohexane. <br> { 20 Triallyloxy propane. |
| 93 Cyclohexyl beryllium hydride | { 220 2,7-diallyloxy octane. <br> { 30 2,4,7-triallyloxy octane. |

EXAMPLE VIII

Various mixtures indicated in Table III below are treated according to the following procedure. The mixture is heated in 150 parts of hexane, in each case, under a blanket of nitrogen under reflux for two hours. Then the hexane is slowly distilled off and, in accordance with the corresponding increase in reflux temperature, the temperature is gradually increased to 70°–80° C., and maintained at that temperature for approximately five hours. Then, the temperature is gradually increased to 120°–130° C. for a period of 72 hours. A solid product is obtained in each case and upon processing as in Example I, each product exhibits excellent burning and thrust properties.

TABLE III

| | |
|---|---|
| 11 Beryllium hydride | 166 Divinyloxy cyclohexene. |
| 11 Beryllium hydride | 120 Vinyloxy cyclohexene. |
| 67 Diethyl beryllium | 60 Divinyloxy cyclohexene. |
| 11 Beryllium hydride | 190 1,7-Divinyloxy octane. |
| 25 Propyl beryllium hydride | 100 1,4,7-trivinyloxy octane. |
| 11 Beryllium hydride <br> 5 Aluminum hydride | { 120 Diallyl ether. |
| 11 Beryllium hydride | { 130 Divinyloxy benzene. <br> { 25 Tris(beta-ethoxy-ethyl)-borane. |

EXAMPLE IX

A solution of 120 parts p-vinyloxy-phenyl acetaylene in 100 parts of cyclohexane is maintained under an atmosphere of nitrogen and at a temperature of 50–55° C. while a solution of 20 parts of beryllium hydride in 100 parts of ether, also under a blanket of nitrogen, is dropped into the cyclohexane solution at such a rate that no more than a 5° rise in temperature occurs. When the temperature rises above 60° C., the beryllium hydride solution is cut off or the rate of addition is reduced until the temperature has subsided to the desired range. During this addition period, the ether is allowed to vaporize from the reaction mass. After all the solution has been added, the heating is continued for a period of two hours, after which the temperature is raised to the solvent reflux temperature for a period of 10 hours. Then the solvent is distilled off, and upon testing, the resultant product shows excellent burning and thrust properties.

EXAMPLE X

A solution of 11 parts of distyryl beryllium and 15 parts of a solid, soluble polymer of para-vinyloxy styrene in 100 parts of toluene, is heated in an atmosphere of nitrogen at 50° C. for one hour. Then the temperature is raised to 70° C. for two hours, and thereafter refluxed for five hours. The toluene is then distilled off and the reaction mixture heated at 120–130° C. for 24 hours. The solid product is washed with heptane to extract traces of unconverted distyryl beryllium. The washed product is more stable in air than the ordinary organo-beryllium compounds which oxidize and burn in air. The resultant product is ground with an equal weight of ammonium perchlorate. The resultant mixture, when ignited, burns very rapidly with an intense white flame, and when tested according to known tests for propellant thrust, shows excellent thrust properties.

EXAMPLE XI

The procedure of Example X is repeated, using 16 parts of a solid, soluble polymer of p-allyloxy-styrene, in place of the vinyloxy-styrene. The product shows similar burning and thrust properties.

EXAMPLE XII

The following procedure is repeated three times using 100 parts of diallyl ether polymer, 120 parts of divinyl benzene-divinyl ether copolymer (80–20 mole ratio) and 160 parts p-vinyloxy-styrene polymer respectively. In each case the polyunsaturated polymer dissolved in 100 parts of benzene, together with any catalyst or modifier, is maintained under an atmosphere of nitrogen at a temperature of 50–55° C. A solution of 11 parts of beryllium hydride in 100 parts of ether is dropped into the reaction mixture covered by a blanket of nitrogen, at such a rate that no more than a 5 percent rise in temperature occurs. When the temperature rises above 60° C. the beryllium hydride solution supply is cut off or reduced until the temperature has subsided to the desired range. During this addition period, the ether is allowed to vaporize from the reaction mass. After all the solution has been added, the heating is continued for a period of two hours, after which the temperature is raised to the solvent reflux temperature for a period of ten hours. Then the solvent is distilled off and heating continued at 90° C. for an additional 15 hours. The resultant product in each case shows excellent burning and thrust properties.

EXAMPLE XIII

A solution of 20 parts of ethyl beryllium hydride, 150 parts of p-allyloxy styrene, 10 parts of styrene and 150 parts of benzene is heated under an atmosphere of nitrogen at 50° C. for one hour, then at 70° C. for two hours, then refluxed for five hours, following which the benzene is distilled off and the reaction mixture heated at 100° C. for 48 hours. Excellent burning and thrust properties are exhibited when the product is tested.

In accordance with the preceding, specific Y groups are illustrated below as repeating units given for polymers prepared in the various examples above. For example, the polymer of Example I has repeating units of the formula 

The polymer of Example IV has a repeating unit of the formula —Be—C₂H₄OC₂H₄—.

The polymer of Example V has a repeating unit of the formula —Be—C₃H₆OC₃H₆—.

In Example VI the polymer derived from divinyloxy toluene has a repeating unit of the formula —Be—C₂H₄OC₆H₃(CH₃)OC₂H₄— that derived from divinyloxy diphenyl has the repeating unit structure —Be—C₂H₄OC₁₂H₈OC₂H₄—; that derived from the diallyl ether of ethylene glycol has a repeating unit structure of —Be—C₃H₆OCH₂CH₂OC₃H₆—; and that derived from diallyloxy benzene has a repeating unit structure of —Be—C₃H₆OC₆H₄OC₃H₆—.

In Example VII, the polymer derived from divinyloxy cyclohexane has a repeating unit of the formula —Be—C₂H₄OC₆H₁₀OC₂H₄— and that derived from diallyloxy octane has the repeating structure

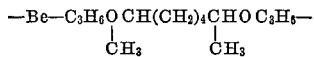

The polymer of Example IX has a repeating unit of the formula

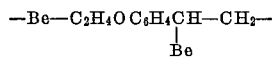

The polymer of Example XIII has a repeating unit of the formula —Be—C₃H₆OC₆H₄C₂H₄—.

The polymerization described herein can be suspended at an early stage to give low-melting, solid polymers, or in some cases viscous oils, which can be stored as such and the polymerization reaction continued at a subsequent time. In fact, the reaction can be suspended when the product comprises substantially a monomeric product, such as, for example, that derived from a beryllium hydride compound and divinyl ether, namely: RBeCH₂CH₂OCH=CH₂, or Be(CH₂CH₂OCH=CH₂)₂, and the polymerization completed later by the application of heat, or the addition of beryllium hydride compounds, or other reagents, catalysts, modifiers, etc.

Various modifiers can be added to the compositions of this invention after the polymerization is completed, and in cases where the modifiers are nonreactive with the beryllium hydride compounds, can be added prior to the initiation of the polymerization, or at some intermediate stage. Hydrocarbon materials, such as various hydrocarbon resins, e.g. polystyrene, polyethylene, polypropylene, polybutenes, paraffins, etc., can be added at any time. Certain other resins that might influence the reaction, or be reduced, or reacted upon by the beryllium hydride compound, such as those containing ester, amide, or other functional groups, can be added after the polymers are formed. However, if sufficient beryllium hydride compound is added to compensate for that used in such side reactions, such resins can often be added before or during the reaction. Typical resins include polyethers, such as polymeric vinyl ethyl ether, polymeric vinyl butyl ether, etc.; polyesters, such as polyvinyl acetate, polyvinyl propionate, polyvinyl butyrate, polymethyl methacrylate, polymethyl acrylate, etc.; polyvinyl acetal, polyvinyl butyral, etc.; polyacrylonitrile, polyamides, such as nylon and polymeric caprolactam, etc.

Various other polyunsaturated compounds, or acetylenic compounds in addition to those indicated above, can also be added, either before initiation of the polymerization, at an intermediate stage, or at the completion of the polymerization reaction to modify the properties of the products. With regard to the esters, etc., reactive with beryllium hydride compounds, the same comments apply as made above with respect to resins having ester groups, etc. Such polyunsaturated compounds include: polyunsaturated hydrocarbons, polyunsaturated esters, polyunsaturated ether-esters, and various alkenyl aluminum compounds formed by the addition of aluminum alkyls to polyalkenyl hydrocarbon or ether compounds, such as methyl-dibutenyl aluminum, tris(vinyloxyethyl)aluminum, etc., and the corresponding boron and magnesium derivatives.

Typical examples of such polyunsaturated compounds include, but are not restricted to, the following:

1,3-butadiene,
isoprene,
2,3-dimethyl butadiene,
pentadiene-1,3,
hexadiene-2,4,
octadiene-2,4,
hexatriene-1,3,5,
2-phenyl-butadiene,
1,3-pentadiene,
hexadiene-1,5,
2,4-dimethyl-pentadiene-1,3,
vinyl cyclohexene,
1-phenyl-pentadiene-1,3,
divinyl cyclohexane,
diallyl,
1,6-heptadiene,
1,8-nonadiene,
2,8-decadiene,
2,9-dimethyl-2,8-decadiene,
divinyl cyclopentane,
divinyl methyl cyclohexane,
dipentenyl cyclohexane,
allyl cyclohexene,
diallyl cyclohexene,
divinyl cyclohexene,
(beta-vinylalkyl)-furane,
(beta-allyl-ethyl)-furane,
diallyl cyclohexane,
diallyl cyclopentane,
dibutenyl cyclohexane,
1,7-diphenyl-heptadiene-1,6,
2,7-diphenyloctadiene-1,7,
divinyl benzene,
trivinyl benzene,
divinyl naphthalene,
trivinyl naphthalene,
divinyl diphenyl,
trivinyl diphenyl,
divinyl toluene,
trivinyl toluene,
divinyl xylene,
divinyl anisole,
divinyl ethyl benzene,
divinyl chlorobenzene,
divinyl methylnaphthalene,
divinyl ethylnaphthalene,
divinyl methyldiphenyl,
divinyl ethyldiphenyl,
divinyl ethoxy naphthalene,
divinyl chloronaphthalene,
divinyl chlorodiphenyl,
divinyl ethoxy diphenyl,
vinyl isopropenyl benzene,
vinyl isopropenyl naphthalene,
vinyl isopropenyl diphenyl,
vinyl isopropenyl toluene,
vinyl isopropenyl anisole,
vinyl isopropenyl chlorobenzene,
vinyl isopropenyl methoxy naphthalene,
vinyl isopropenyl chloronaphthalene,
vinyl isopropenyl methyl chloronaphthalene,
vinyl isopropenyl chlorodiphenyl,
vinyl isopropenyl methoxy diphenyl,
vinyl isobutenyl benzene,
vinyl isobutenyl naphthalene,
vinyl isobutenyl diphenyl,
vinyl allyl benzene,
vinyl allyl naphthalene,
vinyl allyl diphenyl, vinyl allyl toluene,
vinyl allyl anisole,
vinyl allyl methylnaphthalene,
vinyl allyl chlorodiphenyl,
diallyl benzene,
triallyl diphenyl,
diallyl toluene,
diallyl xylene,
diallyl chlorobenzene,
diisopropenyl benzene,
diisopropenyl naphthalene,
diisopropenyl diphenyl,
diisopropenyl toluene,
diisopropenyl anisole,
diisopropenyl methyl naphthalene,
diisopropenyl chlorodiphenyl,
dimethylallyl benzene,
dimethylallyl naphthalene,
dimethylallyl diphenyl,
bis-(alpha-ethyl-ethenyl)-benzene,
bis-(alpha-vinyl-ethyl)-benzene,
bis-(alpha-vinyl-ethyl)-naphthalene,
bis-(alpha-vinyl-ethyl)-diphenyl,
vinyl (alpha-vinyl-ethyl)-benzene,
vinyl (alpha-vinyl-ethyl)-naphthalene,
vinyl (alpha-vinyl-ethyl)-diphenyl,
dipropenyl benzene,
p-propenyl styrene,
para-propenyl isopropenyl-benzene,
dicrotyl benzene,
dicrotyl naphthalene,
dicrotyl diphenyl,
dicrotyl anisole,
dicrotyl xylene,
bis-(4-vinyl-n-butyl)-benzene,
bis-(5-isopropenyl-h-hexyl)-benzene,
bis-(5-isopropenyl-n-hexyl)-diphenyl,
bis-(5-methyl-hepten-5-yl)-benzene,
bis-(5-methyl-nonen-6-yl)-diphenyl,
bis-(n-decen-5-yl)-toluene,
dicyclopentenyl-naphthalene,
di-cyclohexenyl-benzene,
acetylene,
allene,
methyl acetylene,
vinyl acetylene,
phenyl acetylene,
phenylene diacetylene,
naphthalene diacetylene,
naphthyl acetylene,
cyclohexyl acetylene,
allyl acrylate,
allyl methacrylate,
vinyl acrylate,
vinyl methacrylate,
isopropenyl acrylate,
isopropenyl methacrylate,
butenyl acrylate,
butenyl methacrylate,
vinyl crotonate,
allyl crotonate,
isopropenyl crotonate,
propenyl crotonate,
isobutenyl crotonate,
ethylene glycol diacrylate,
trimethylene glycol diacrylate,
tetramethylene glycol diacrylate,
pentamethylene glycol dimethacrylate,
divinyl phthalate,
diallyl phthalate,
diisopropenyl phthalate,
dibutenyl phthalate,
divinyl diphenyl-dicarboxylate,
diallyl naphthalene-dicarboxylate,
diallyl itaconate,
divinyl itaconate,
divinyl maleate,
diallyl maleate,
diallyl succinate,
diisopropenyl succinate,
dibutenyl succinate,
divinyl succinate,
diallyl adipate,
divinyl adipate,
diallyl azelate,
divinyl azelate,
diisopropenyl suberate,
divinyl pimelate,
diallyl glutarate,
diisopropenyl glutarate,
divinyl sebacate,
diallyl sebacate,
diallyl jananate,
divinyl octadecanedioate,
vinyl 11-acryloxyundecanoate,
allyl 11-methacryloxy undecanoate,
isopropenyl 5-crotonoxy-caproate,
vinyl 4-acryloxy-caproate,
vinyl 11-vinyloxy-undecanoate,
allyl 11-allyloxy-undecanoate,
vinyl 11-allyloxy undecanoate,
isopropenyl 11-isopropenyloxy-undecanoate,
vinyl 5-vinyloxy-caproate,
vinyl 5-crotyloxy-caproate,
vinyl 5-alloxy-caproate,
allyl 5-alloxy-caproate,
isopropenyl 5-isopropenyloxy-caproate,
vinyloxy-tetramethylene acrylate,
allyloxy-hexamethylene methacrylate,
allyloxy-octamethylene crotonate,
isopropenyloxy-octamethylene acrylate,
crotyloxy-hexamethylene methacrylate,
ethyl diallyl aluminum,
propyl dibutenyl aluminum,
butyl dibutenyl aluminum,
tributenyl borane,
tetrabutenyl diborane,
dibutenyl magnesium,
diallyl magnesium, triallyl borane, etc.

In addition to the polyalkenyl types of aluminum, magnesium, and boron compounds indicated above, it is desirable in some cases to add monoalkenyl aluminum, magnesium, and boron compounds, and to continue replacement of the remaining hydrogen or saturated hydrocarbon groups on the beryllium by means of the polyalkenyl compounds, or by such compounds which have already partially reacted with beryllium. By these techniques both beryllium and aluminum, magnesium, or boron, can be incorporated in polymeric materials.

For many purposes, such as fuel, it is desirable to have a high concentration of the beryllium polymeric units present in the compositions. In such cases, the modifiers are used in minor amounts. However, in certain cases, it may be desirable to use the beryllium compositions to modify or fortify the properties of other materials, in which case the beryllium derivatives are used in minor amounts.

As indicated above, the berylium polymers of this invention are particularly useful as solid fuels. They can be used as the main fuel component, or can be added to various types of other fuels to fortify or supplement such fuels. For example, they can be used as additives to gasoline and other motor fuels, to kerosene and other materials used for turbojet engines, and jet engines, and can be added to liquid and solid propellant fuels used for rockets, missiles, etc. However, these polymeric compositions are particularly useful as the main fuel component in solid propellant fuels used for rockets and related devices. In such latter cases, it is advantageous to convert the fuel to an infusible form. If modifiers, or auxiliary agents are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and can be stored in inert atmospheres without danger of premature ignition or explosion. After the desired amount of oxidizing agent has been incorporated into the polymeric composition, it can be converted to an infusible form by various means, including the addition of more beryllium hydride compounds, or the addition of ether to catalyze further beryllium-ethylenic addition, the application of moderate heating for similar addition, or effecting crosslinking through the unsaturated groups themselves by heat alone, or by the addition of peroxy, azo, or other free radical-generating catalysts, or by any other means of crosslinking.

Oxidizing agents which can be incorporated in the resin for the ultimate purpose of supporting combustion of the resin and which can be incorporated in accordance with safety conditions determined by their reactivity, include: the solid and liquid perchloryl aryl compounds of the formula Ar—Cl—$O_3$, such as perchloryl benzene, perchloryl toluene, etc., various perchlorates, nitrates, oxides, persulfates, and perborates of metals and ammonia, such as ammonium perchlorate, potassium perchlorate, sodium perchlorate, ammonium nitrate, potassium nitrate, sodium nitrate, potassium permanganate, potassium chlorate, manganese dioxide, potassium iodate, potassium dichromate, chloric acid, perchloric acid, ammonium persulfate, ammonium dichromate, ammonium iodate, aluminum nitrate, barium chlorate, barium perchlorate, barium permanganate, lithium perchlorate, lithium dichromate, lithium permanganate, etc.

Some of these oxidizing agents are not self-sustaining oxidizing agents, and can be used when free oxygen, or compositions such as perchloryl fluoride, highly concentrated hydrogen peroxide, etc., which generate oxygen in situ, are passed in surface contact with the fuel. The liquid oxidizing agents can be incorporated with precautions to assure uniform distribution through the polymer mass and to avoid ignition or explosive conditions during preparation and use of the fuel. It is desirable that the products from reaction of the oxidizing agent and the resin are gaseous in their normal state so that the energy developed in the system will not be robbed of energy to convert them to the gaseous state.

It is generally desirable that the fuel be molded in the shape in which it is ultimately to be used before the composition is converted to an infusible state. In fact, the fuel can even be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the fuel machined to give the desired shape. For example, cylindrical shapes are generally desirable with an opening running through the cylinder along its linear axis. If desired, there can be a plurality of such openings running through the length of the mass so that more than one oxidizing stream can function simultaneously. However, various other shapes can be used, such as blocks having rectangular or square cross section with one or more openings running along the linear axis of the block.

While the aforementioned shapes are preferred, it is also possible to use smaller units or shapes made by the practice of this invention, and then to assemble them in a space or container advantageously in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. A cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In addition to the foregoing, the resin-oxidizing agent composition can be made in various other shapes, depending on the manner in which it is ultimately to be used. As a further example, it can be shaped as a solid rod, in which case the burning surface will be the outer surface of the rod or cylinder. The outer surface of the rod can be ignited and if a supplementary oxidizing fluid is used, this can be directed against such outer surface of the rod. If desired, the rod can be advanced through an opening in accordance with the desired rate at which the surface is to be exposed to a supplementary oxidizing fluid. The composition can also be shaped in the form of granules, pellets, etc., where it is desired to modify the surface area that is to be exposed for combustion. Such granules can be used as such, or can be adhered to metal surfaces in accordance with the present known art in the use of solid propellant fuel in granular form.

When the oxidizing agent to be added is a solid, it is desirably in fine particle size so as to permit substantially uniform distribution throughout the mass. The oxidizing composition which is to be passed in surface contact with the fuel is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used. The type of fuel base material used together with its heat capacity and heat transmission properties, the temperature which will exist in the preparation and use of the fuel, etc.

Since the fuel composition of this invention can be used according to various methods, varying from the use of a substantial amount of supplemental oxidizing fluid to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen that is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped into contact with the fuel. Obviously, therefore, the proportion of oxidizing agent imbedded in the fuel base material can vary from 5 percent to approximately 95 percent depending on the various factors involved, such as the efficiency desired, the method and convenience of operation, and the materials being used. Generally, when an oxidizing agent is imbedded in the base material, it is advantageous to use form about 5 percent to 95 percent, preferably about 20 percent to about 75 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to use an oxidizing fluid on the surface of the fuel. In such cases, the combustion of the fuel is initiated by igniting it by various means presently used for that purpose, such as a mixture of hydrazine, or unsymmetrical dimethyl hydrazine, and nitric acid, or by triethyl aluminum and oxygen, or by a torch, or by an electrical ignition system. When the oxidizing agent is not present in self-sustaining amount, liquid oxygen or an efficient oxidizing compound such as perchloryl fluoride ($FClO_3$) can be pumped into contact with the surface of the fuel to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting, where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit, it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, the thermoplastic material can desirably be softened by the addition of a softening agent, or, as indicated above, by the modifier itself. Such compounded mixtures can then be extruded, or otherwise shaped into the desired form and then polymerized to infusibility. In some cases, depending on the particle size of the solid oxidizing agent and the amount of void space between particles, the polymer in liquid state, or the monomer from which it is to be prepared, together with a polymeriaztion catalyst of the peroxy or azo type, can be poured into a container holding the solid oxidizing agent and thereby fill the void spaces. Then upon standing at room temperature, or at slightly raised temperatures, the polymer or monomer will be converted to an infusible state with the oxidizing agent embedded therein.

However, whichever method of mixing is used, it is desirable to avoid the generation of heat that will raise the temperature to the ignition point of the oxidizing agent. Therefore, in some cases, it is desirable to precool the materials to be mixed or to provide means to withdraw the heat as it is generated.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A polymeric composition useful as a solid propellant fuel consisting essentially of 5–95 percent by of weight of an oxidizer selected from the class consisting of solid and liquid oxidizers and 95–5 percent by weight of a polymer having a plurality of repeating units in the polymer molecule thereof having a formula —Be—Y— wherein Y is a polyvalent radical consisting of hydrocarbon and ether portions, said valencies being connected to hydrocarbon portions thereof.

2. A polymeric composition of claim 1 in which said polymer has a plurality of repeating units in the polymer molecule thereof having the formula $$-Be-C_2H_4OC_2H_4-$$

3. A polymeric composition of claim 1 in which said polymer has a plurality of repeating units in the polymer molecule thereof having the formula $$-Be-CH_3H_6OC_3H_6-$$

4. A polymeric composition of claim 1 in which said polymer has a plurality of repeating units in the polymer molecule thereof having the formula $$-Be-C_2H_4OC_6H_4OC_2H_4-$$

5. A polymeric composition of claim 1 in which said polymer has a plurality of repeating units in the polymer molecule thereof having the formula $$-Be-C_2H_4OC_{12}H_8OC_2H_4-$$

6. A polymeric composition of claim 1 in which said polymer has a plurality of repeating units in the polymer molecule thereof having the formula $$-Be-C_3H_6OCH_2CH_2OC_3H_6-$$

7. A polymeric composition of claim 1 in which said polymer has a plurality of repeating units in the polymer molecule thereof having the formula $$-Be-C_3H_6OC_6H_4OC_2H_6-$$

8. A polymeric composition of claim 1 in which said polymer has a plurality of repeating units in the polymer molecule thereof having the formula $$-Be-C_3H_6OC_6H_4C_2H_4-$$

9. A polymeric composition of claim 1 in which said polymer has a plurality of repeating units in the polymer molecule thereof having the formula $$-Be-C_2H_4OC_6H_{10}OC_2H_4-$$

10. A polymeric composition of claim 1 in which said oxidizer is potassium perchlorate.

11. A polymeric composition of claim 1 in which said oxidized is ammonium perchlorate.

12. A polymeric composition of claim 1 in which said oxidizer is an aryl perchloryl compound.

13. A polymeric composition of claim 1 in which said oxidizer is perchloryl benzene.

14. A polymeric composition of claim 1 in which said oxidizer is lithium perchlorate.

15. A polymeric composition of claim 1 in which said oxidizer is sodium perchlorate.

16. A polymeric composition of claim 1 in which said oxidizer is potassium perchlorate and said polymer has a plurality of repeating units in the polymer molecules thereof having the formula —Be—$C_2H_4OC_2H_4$—.

17. A polymeric composition of claim 1 in which said oxidizer is potassium perchlorate and said polymer has a plurality of repeating units in the polymer molecules thereof having the formula —Be—$C_3H_6OC_3H_6$—.

18. A polymeric composition of claim 1 in which said oxidizer is potassium perchlorate and said polymer has a plurality of repeating units in the polymer molecules thereof having the formula —Be—$C_2H_4OC_6H_4OC_2H_4$—.

19. A polymeric composition of claim 1 in which said oxidizer is potassium perchlorate and said polymer has a plurality of repeating units in the polymer molecules thereof having the formula —Be—$C_3H_6OC_6H_4C_2H_4$—.

20. A polymeric composition of claim 1 in which said oxidizer is potassium perchlorate and said polymer has a plurality of repeating units in the polymer molecules thereof having the formula —Be—$C_3H_6OC_6H_4OC_3H_6$—.

References Cited

UNITED STATES PATENTS 3,203,171  8/1965  Burke et al. _____ 149—19 X

BENJAMIN R. PADGETT, Primary Examiner

U.S. Cl. X.R.

149—109

PO-1050
(5/69)

UNITED STATES PATENT OFFICE
CERTIFICATE OF CORRECTION

Patent No. 3,479,235                    Dated November 18, 1969

Inventor(s) GAETANO F. D'ALELIO

It is certified that error appears in the above-identified patent and that said Letters Patent are hereby corrected as shown below:

Claim 3, (Col. 16, Line 30), the formula should read
$-Be-C_3H_6OC_3H_6-$ ;

Claim 11, (Col. 16, Line 64), The word "oxidized" should read --- oxidizer --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents